United States Patent
Sugawa et al.

(10) Patent No.: US 6,500,518 B2
(45) Date of Patent: *Dec. 31, 2002

(54) EPOXY OPTICAL SHEET AND PROCESS FOR PRODUCING THE SAME

(75) Inventors: Hiroshi Sugawa; Kazuhiko Tahara; Shuzo Fujiwara; Nobuyoshi Yagi; Yoshimasa Sakata; Toshiyuki Umehara, all of Osaka (JP)

(73) Assignee: Nitto Denko Corporation, Osaka (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/305,742

(22) Filed: May 6, 1999

(65) Prior Publication Data
US 2002/0119298 A1 Aug. 29, 2002

(30) Foreign Application Priority Data
May 26, 1998 (JP) ............................................. 10-161334

(51) Int. Cl.⁷ ............................ B32B 27/38; B32B 33/00

(52) U.S. Cl. ....................... 428/141; 428/220; 428/413
(58) Field of Search .................................. 428/220, 413, 428/1.53, 141, 172; 156/230, 231

(56) References Cited

U.S. PATENT DOCUMENTS 4,321,102 A * 3/1982 Drexler et al. ............... 156/246
4,576,896 A * 3/1986 Suzuki et al. ................ 430/271

FOREIGN PATENT DOCUMENTS

JP 6-228274 8/1994
JP 06228274 A * 8/1994

OTHER PUBLICATIONS

Derwent Abstract 1994–299853, abstract of JP 06228274A, Aug. 1994.*

* cited by examiner

Primary Examiner—Paul Thibodeau
Assistant Examiner—Ramsey Zacharia
(74) Attorney, Agent, or Firm—Sughrue Mion, PLLC

(57) ABSTRACT

An epoxy optical sheet having a thickness of 500 μm or less, a high thickness accuracy, a small retardation and an excellent heat resistance; and a process by which the optical sheet can be efficiently produced.

2 Claims, 1 Drawing Sheet

FIGURE
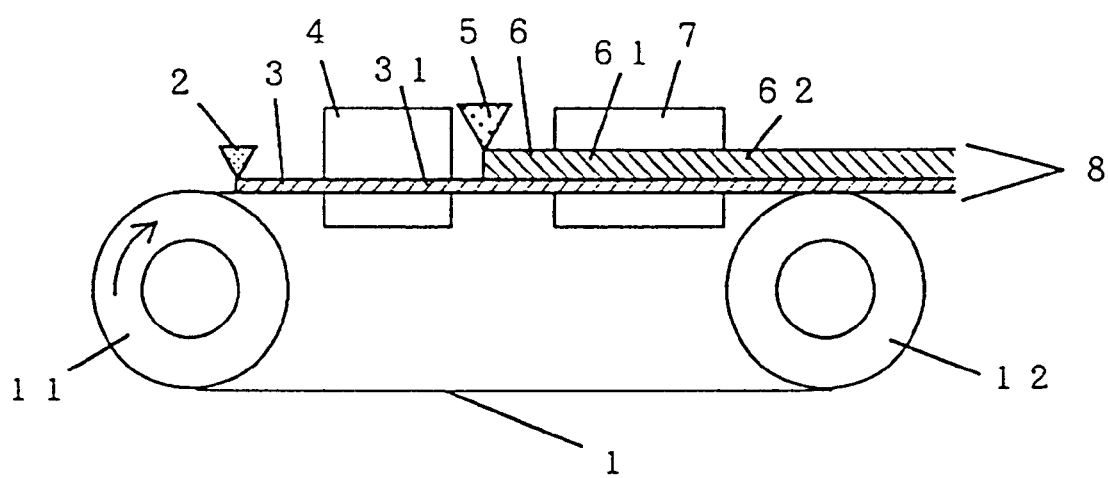

EPOXY OPTICAL SHEET AND PROCESS FOR PRODUCING THE SAME

FIELD OF THE INVENTION

This invention relates to an epoxy optical sheet excellent in optical properties and heat resistance, and a process for producing the epoxy optical sheets at high mass-productivity.

BACKGROUND OF THE INVENTION

Conventional optical sheets made of epoxy resins are those obtained by pouring an epoxy resin into a space of a cast mold followed by hardening (JP-A-6-337408, JP-A-7-28043 and JP-A-7-120741; the term "JP-A" as used herein means an "unexamined published Japanese patent application"). However, it is difficult by this casting method to obtain a sheet having a thickness of 500 μm or less and being free from any optical strain.

In a method wherein a hardened plate made of an epoxy resin is cut into a sheet, optical strain generates in cutting step when a thickness is 500 μm or less. As a result, it was also difficult to obtain an optical strain-free sheet by this method. Thus, epoxy optical sheets having high thickness accuracy at a thickness of 500 μm or less, small retardation and excellent heat resistance have not yet been provided, in spite of a demand therefor.

Moreover, the above-described method suffers from a disadvantage that the complicated steps such as casting and mold opening are required, and this results in poor production efficiency of epoxy optical sheets. Thus, a method is considered, which continuously produces epoxy optical sheets by, for example, a calender method using rolling rolls, a melt extrusion method with T-die or the like, or a flow casting method of a resin solution onto a support, according to the conventional resin sheet production.

However, the epoxy resin involves use as adhesives. Therefore, when the epoxy resin is molded into a sheet by these methods, the epoxy resin adheres to rolls, dies, supports, etc. As a result, it is impossible to easily separate and recover the molded sheets, resulting in breakage of the sheet in separation thereof. In addition, there arises another problem that the thus obtained sheets tend to have uneven surface and thus fail to achieve the required surface smoothness required in optical sheets.

SUMMARY OF THE INVENTION

Accordingly, one object of the present invention is to provide an epoxy optical sheet having a thickness of 500 μm or less, an excellent thickness accuracy, a small retardation and a high heat resistance.

Another object of the present invention is to provide a process for producing the epoxy optical sheet at high efficiency.

The present invention provides an epoxy optical sheet comprising a hardened sheet comprising an epoxy resin, and another resin layer formed on one side thereof, wherein the sheet has a retardation of 5 nm or less, an average thickness of 500 μm or less, a thickness accuracy of ±10% or less, a glass transition temperature of 170° C. or above and a smooth surface.

The present invention further provides a process for continuously producing an epoxy optical sheet, which comprises successively forming a strippable resin layer on a support having a smooth surface, successively spreading an epoxy resin coating solution comprising an epoxy resin, a hardener, a hardening, accelerator and a leveling agent onto the resin layer in the form of a sheet, followed by hardening treatment, thereby forming a hardened sheet adhering to the resin layer; and at the same time, recovering the hardened sheet together with the resin layer from the support.

BRIEF DESCRIPTION OF THE DRAWING

The FIGURE is a view showing the production process according to the present invention, wherein 1 is an endless belt (support), 31 is a resin layer, 61 is a spread layer of an epoxy resin coating solution, 7 is a hardening device, 62 is a hardened sheet and 8 is an epoxy optical sheet.

DETAILED DESCRIPTION OF THE INVENTION

According to the production process of the present invention, the epoxy optical sheet having the strippable resin layer can be separated from the support and thus recovered. Therefore, the surface conditions of the support can be appropriately transcribed and reflected via the resin layer. As a result, sheets having excellent optical properties, such as mirror surface, can be continuously and efficiently produced by a series of convenient procedures. Also, the mass production speed can be easily controlled by regulating the moving rate of the spread layer mediated by the support. Moreover, the thickness of the sheet can be easily controlled by regulating the moving rate and the spread of the coating solution. Consequently, it is possible to obtain an epoxy optical sheet having an average thickness of 500 μm or less, a high thickness accuracy, a small retardation and an excellent heat resistance.

The epoxy optical sheet of the present invention comprises a hardened sheet comprising an epoxy resin, and another resin layer formed on one side thereof, wherein the sheet has a retardation of 5 nm or less, an average thickness of 500 μm or less, a thickness accuracy of ±10% or less, a glass transition temperature of 170° C. or above, and a smooth surface. FIG. 1 shows an example of the production process of the sheet, wherein 8 is an epoxy optical sheet, 31 is a resin layer, and 62 is a hardened sheet of an epoxy resin.

The process for producing an epoxy optical sheet according to the present invention comprises, for example, successively forming a strippable resin layer on a support having a smooth surface; successively spreading an epoxy resin coating solution comprising an epoxy resin, a hardener, a hardening accelerator and a leveling agent onto the resin layer in the form of sheet, followed by hardening treatment, thereby forming a hardened sheet adhering to the resin layer, and at the same time, recovering the hardened sheet together with the resin layer from the support. According to this process, an epoxy optical sheet can be continuously produced at high mass productivity.

The FIGURE shows an example of the production step by the above process. In this process, continuous production is performed by the flow casting method. A support comprising an endless belt 1 having a smooth surface is driven at a definite speed (for example, 0.1 to 10 m/minute, preferably 0.2 to 5 m/min) via a driving drum 11 and a coupled driving drum 12. During this operation, a resin solution 3 is continuously applied on the support via a die 2, dried and hardened optionally under heating or by irradiation with light to obtain a film 31. In this FIGURE, an ultraviolet radiator 4 is disposed.

While successively forming the resin layer 31 on the support as described above, an epoxy resin coating solution 6 is successively applied on the resin layer via a die 5 and spread into the form of a sheet. The spread layer 61 is then hardened with the use of an appropriate hardening device 7 of the heating or irradiation type. Thus a hardened sheet 62 adhering to the resin layer 31 is successively formed and, at the same time, separated together with the resin layer 31 from the support 1, thus continuously producing an epoxy optical sheet 8.

From the viewpoint of preventing cracking, etc., it is preferable to recover the epoxy optical sheet from the support in a high temperature atmosphere exceeding the glass transition temperature. Therefore, it is preferable to perform the recovery after hardening the epoxy resin through epoxy group has proceeded at an extent of about 70% or more and the resin has been hardened so as not to undergo plastic deformation even in a high temperature atmosphere (i.e., at the hardening temperature in the case of heat hardening or at around the glass transition temperature), thus preventing cracking or deformation as described above.

In recovering the epoxy optical sheet from the support, an appropriate stripping means may be used if necessary. The thus formed continuous epoxy optical sheet can be cut into pieces of appropriate size, if necessary, using laser beams, an ultrasonic cutter, a dicer or water jet followed by recovery.

In the above-described process, an appropriate support, for example, a belt such as an endless belt, a plate or a drum, can be used so long as the epoxy resin coating solution can be successively and continuously spread thereon and the spread layer is supported thereby and thus maintained in the form of a sheet. The support may be made of any material so long as it can withstand the treatment for hardening the epoxy resin. Therefore, preferred examples are, for example, metals such as stainless steel, copper and aluminum, glass and plastics. Of those, stainless steel is preferable from the standpoint of durability or the like.

It is preferable that the surface of the support is as smooth as possible from the point of improvement in thickness accuracy or the like. For example, an epoxy optical sheet having a mirror surface can be obtained by using a support with a surface roughness (Ra) of 0.02 $\mu$m or less. Therefore, in the course of the formation of the resin layer or the hardened sheet, it is preferable to maintain the surface of the support as horizontally as possible. Thus, an epoxy optical sheet having a thickness accuracy of ±10% or less can be easily obtained.

To successively form the resin layer on the support, any appropriate strippable transparent resin can be used without limitation so long as the resin never or little adheres to the support and can be easily stripped therefrom. Examples of such a resin include urethane resins, acrylic resins, polyester resins, polyvinyl alcohol resins (for example, polyvinyl alcohol/ethylene vinyl alcohol copolymer), vinyl chloride resins and vinylidene chloride resins.

To form the resin layer, it is also possible to use polyarylate resins, sulfone resins, amide resins, imideresins, polyether sulfone resins, polyether imide resins, polycarbonate resins, silicone resins, fluororesins, polyolefin resins, styrene resins, vinylpyrrolidone resins, cellulose resins, acrylonitrile resins, etc. It is also possible to use a blend of two or more appropriate transparent resins in the formation of the resin layer.

The resin layer, which is stripped together with the sheet formed above and thus functions as the surface layer in one side of the epoxy optical sheet, is preferably one having excellent optical properties such as transparency. Taking these optical properties, the strippability, in particular, to a stainless support, etc., into consideration, it is preferable to use an urethane resin for the formation of the resin layer.

As described above, the resin layer functions as the surface coat layer of the epoxy optical sheet. From this point of view, the material of the resin layer may be selected so as to impart various functions to the sheet, for example, chemical resistance, surface hardness, optical anisotropy, low water absorption, low moisture-permeability and gas barrier properties such as low oxygen-permeability. Accordingly, the resin layer may have either a single-layered structure or a laminated structure wherein, for example, a polyvinyl alcohol resin layer aiming at imparting gas barrier properties is formed on an urethane resin layer aiming at imparting strippability.

The resin layer may be formed by, for example, optionally dissolving the resin in an appropriate solvent (organic solvent, water, etc.), applying the resulting solution onto the definite side of the support in an appropriate manner (roll coating, wire barcoating, extrusion coating, curtain coating, spray coating, etc.), drying it if needed, and then hardening the same by a method suitable depending on the resin (heating, light irradiation, etc.).

Where the above coating method is used, the viscosity of the resin solution is preferably regulated to 1 to 100 centipoise so as to achieve uniform coating. When the resin solution is applied to the endless belt by the flow casting method as described above, the extrusion coating method is preferable from the viewpoint of the coating efficiency, etc. In this case, it is preferable to regulate the viscosity of the resin solution to 1 to 10 centipoise. When a coating layer of an urethane resin, etc., is to be hardened by light irradiation, it is preferably to use a high-pressure or low-pressure UV lamp having a central wavelength of 365 nm or 254 nm so as to achieve an efficient treatment.

The thickness of the resin layer thus formed can be appropriately determined. To achieve high strippability and prevent cracking in the step of stripping, the thickness of each unit layer is generally from 1 to 10 $\mu$m, preferably 8 $\mu$m or less, and more preferably from 2 to 5 $\mu$m.

To prepare the epoxy resin coating solution to be spread onto the resin layer, at least an epoxy resin, a hardener, a hardening accelerator and a leveling agent are used. The epoxy resin is not particularly limited and appropriately selected depending on, for example, the purpose of use of the epoxy optical sheet to be produced.

Examples of the epoxy resin include bisphenol resins (bisphenol A, bisphenol F, bisphenol S, etc., each optionally hydrogenated), novolak resins (phenol novolak, cresol novolak, etc.), nitrogen-containing cyclic resins (triglycidyl is-ocyanurate, hydantoin, etc.), alicyclic resins, aliphatic resins, aromatic resins (naphthalene, etc.), glycidyl ether resins, low-water absorptive resins (biphenyl, etc.), dicylco resins, ester resins, ether ester resins and modifications thereof.

From the viewpoint of optical properties such as transparency, it is preferable to use as the epoxy resin, for example, an alicyclic resin which contains no conjugated double bond, as in benzene ring, and scarcely undergoes color change. In general, an epoxy resin having an epoxy equivalent of from 100 to 1,000 and a softening point of 120° C. or below is preferably used from the standpoint of the mechanical properties (flexibility, strength, etc.) of the obtained optical sheet. Moreover, it is preferable to use a two-part liquid system which is in the form of a liquid at the coating temperature or below, in particular, at ordinary temperature so as to obtain en epoxy resin coating solution being excellent in the coatability and spreading property into a sheet. Epoxy resin may be used alone or as a mixture of two or more thereof.

The hardener is not also particularly limited. Either one hardener or a mixture of two or more thereof may be used depending on the epoxy resin. Examples of the hardener include organic acid compounds (tetrahydrophthalic acid, methyltetrahydrophthalic acid, hexahydrophthalic acid, methylhexahydrophthalic acid, etc.) and amine compounds (ethylenediamine, propyelnediamine, diethylenetriamine, tri-ethylenetetramine, amine adducts thereof, methaphenylenediamine, diaminodiphenylmethane, diaminodiphenylsulfone, etc.).

Further examples of the hardener include amide compounds (dicyandiamine, polyamide, etc.), hydrazide compounds (dihydrazide, etc.) and imidazole compounds (methylimidazole, 2-ethyl-4-methylimidazole, ethylimidazole, isopropylimidazole, 2,4-dimethylimidazole, phenylimidazole, undecylimidazole, heptadecylimidazole, 2-phenyl-4-methylimidazole, etc.).

Still further examples of the hardener include imidazoline compounds (methylimidazoline, 2-ethyl-4-methylimidazoline, ethylimidazoline, isopropylimidazoline, 2,4-dimethyl-imidazoline, phenylimidazoline, undecylimidazoline, heptadecylimidazoline, 2-phenyl-4-methylimidazoline, etc.), phenol compounds, urea compounds and polysulfide compounds.

In addition, acid anhydrides, etc., can be used as the hardener. Those acid anhydrides are preferably used from the standpoints of working environment due to low irritativeness, durability to high temperatures of the obtained sheet due to improvement in heat resistance, prevention of discoloration, etc. Examples of those acid anhydrides include phthalic anhydride, maleic anhydride, trimellitic anhydride, pyromellitic anhydride, nadic anhydride, glutaric anhydride, tetrahydrophthalic anhydride, methyltetrahydrophthalic anhydride, hexahydrophthalic anhydride, methylhexahydrophthalic anhydride, methylnadic anhydride, dodecenylsuccinic anhydride, dichlorosuccinic anhydride, benzophenonetetracarboxylic anhydride and chlorendic anhdride.

Of those, it is preferable to use colorless or pale yellow acid anhydride hardeners having a molecular weight of from about 140 to about 200, such as phthalic anhydride, tetrahydrophthalic anhydride, hexahydrophthalic anhydride or methylhexahydrophthalic anhydride.

The amount of the hardener to be added is appropriately determined depending on the type thereof, the epoxy equivalent of the epoxy resin, etc. That is, the amount is determined according to the case of the conventional hardening of epoxy resins. In the case of the acid anhydride hardeners, for example, it is used in the proportion of 0.5 to 1.5 equivalents, preferably 0.6 to 1.4 equivalents and more preferably 0.7 to 1.2 equivalents, per equivalent of the epoxy group, from the standpoint of the color tint of the sheet obtained and preventing decrease in moisture resistance. Even if the hardener is used alone or two or more thereof, the amount is according to the above equivalent ratio.

Similarly, the hardening accelerator is not particularly limited. There are used one or more appropriate ones selected from, for example, tertiary amines, imidazoles, quaternary ammonium salts, organic metal salts, phosphorus compounds and urea compounds, depending on the epoxy resin and the hardener used. Use of the hardening accelerator makes it possible to accelerate the hardening speed, thereby shortening the hardening time. As a result, the length of the support can be reduced to one by several times compared with the case that the hardening accelerator is not used. Therefore, the amount of the hardening accelerator to be added is determined depending on the accelerating effect, etc. In general, the hardening accelerator is added in an amount of from 0.05 to 7 parts by weight, preferably form 0.1 to 5 parts by weight, and more preferably form 0.2 to 3 parts by weight, per 100 parts by weight of the epoxy resin from the standpoint of prevention of discoloration or the like.

The leveling agent is added to form a smooth surface by preventing the surface from matting by uneven surface tension due to scattering of the hardener, etc. in the step of hardening the spread layer of the epoxy resin coating solution while being in contact with air. For example, there are used one or more appropriate substances capable of lowering surface tension, such as various surfactants (for example, silicone, acrylic and fluorinated surfactants).

In preparing the epoxy resin coating solution, it is also possible to add, if necessary, appropriate components which are sometimes used in epoxy resin hardened products, for example, antioxidants (phenols, amines, organosulfur compounds, phosphines, etc.) modifiers (glycols, silicones, alcohols, etc.), antifoaming agents, hydroxyl-containing compounds, dyes, discoloration inhibitors, and UV absorbers. The antifoaming agents are added in order to prevent the inclusion of bubbles which deteriorate the optical properties of the sheet obtained. Polyhydric alcohols such as glycerol can be preferably used therefor.

The epoxy resin coating solution can be prepared by making the components flowable or spreadable optionally with the use of solvents. Therefore, the epoxy resin coating solution can be spread by a method appropriate for the formation of the resin layer as described above (for example, curtain coating, roll coating) by which the epoxy resin coating solution can be spread and molded into a sheet. In the case of flow casting, it is preferred to employ the extrusion coating method from the viewpoint of the coating efficiency, etc.

The epoxy optical sheet according to the present invention comprises a hardened sheet comprising an epoxy resin and shows a high heat resistance such that a glass transition temperature is 170° C. or above. Thus, it is usable as a liquid crystal cell substrate, etc., withstanding high temperature atmospheres encountering in the process of producing liquid crystal cells. This glass transition temperature is a value measured by the thermomechanical analysis (TMA) of the tensile mode under elevating temperature at a rate of 2° C./minute.

The epoxy optical sheet has a thickness of 500 $\mu$m or less, preferably from 100 to of 400 $\mu$m and more preferably from 200 to 300 $\mu$m, from the viewpoints of rigidity (such as flexural strength), surface smoothness, low retardation, thin and lightweight characteristics, etc. Also the epoxy optical sheet has a thickness accuracy of ±10% or less, by taking the optical purposes of use, etc., into consideration. The thickness accuracy is determined based on the difference between the maximum value and the average thickness and between the minimum value and the average thickness by measuring the thickness of the sheet at 10 points at regular intervals in the width direction and at intervals of 60 mm in the length direction.

The epoxy optical sheet shows a retardation of 5 nm or less from the viewpoint of preventing coloration due to birefringence when it is applied to a liquid crystal cell, etc. The retardation can be examined with a birefringence measurement device.

The epoxy optical sheet according to the present invention can preferably be used in various optical purposes, for example, liquid crystal cell substrates and anti-reflection sheets. Because of being excellent in optical properties, heat resistance and surface smoothness, the epoxy optical sheet can particularly preferably used in optical purposes where a high heat durability, a high flexural strength, a small retardation and a light weight are required, for example, liquid crystal cells.

The present invention is described in more detail by reference to the following examples, but it should be understood that the invention is not construed as being limited thereto. Unless otherwise indicated, all parts, percents, ratios and the like are by weight.

EXAMPLE 1

An epoxy resin coating solution was prepared by mixing under stirring 100 parts of 3,4-epoxycyclohexylmethyl-3,4-epoxycyclohexane carboxylate, 125 parts of methylhexahydrophthalic anhydride, 3.75 parts of tetra-n-butylphosphonium o,o-diethylphosphorodithioate, 2.25 parts of glycerol and 0.07 parts of a silicone surfactant (leveling agent, Disparon LS-009, manufactured by Kusumoto Kasei K.K.) and aging the resulting mixture at 49° C. for 90 minutes.

A 17 wt % solution of an urethane UV-hardenable resin (NK Oligo UN-01, manufactured by Shin-Nakamura Kagaku K.K.) in toluene was discharged from a die by the flow casting method as shown in FIG. 1 and applied onto an endless belt rotationally driven at a definite speed (0.2 m/minute). After evaporating the toluene, the resin was hardened by UV-irradiation (central wavelength: 254 nm, accumulative quantity of light: 2,000 mJ/cm$^2$) to thereby form an urethane resin layer having a width of 500 mm and a thickness of 2 $\mu$m.

Subsequently, the above epoxy resin coating solution was continuously discharged at a rate of 100 g/minute onto the hardened urethane resin layer and spread into a sheet, while continuing the above procedure. The spread layer was hardened by heating through a heater at 120° C. for 30 minutes. The hardened sheet was separated and recovered, together with the urethane resin layer adhering thereto, from the endless belt on a coupled driving drum adjusted to 150° C. The thus-recovered sheet was then cut into pieces at intervals of 490 mm in the flow direction, thereby continuously obtaining epoxy optical sheets having a width of 490 mm and an average thickness of 400 pm, which had a thickness accuracy of ±40 $\mu$m or less, a retardation of 5 nm or less and a glass transition temperature of 170° C. or above.

EXAMPLE 2

Example 1 was followed except for using a fluorine surfactant (Defenser MCF-323, manufactured by Dainippon Ink and Chemicals Corp.) in place of the silicone surfactant, thereby continuously obtaining epoxy optical sheets of 400 $\mu$m in average thickness which had a thickness accuracy of ±40 $\mu$m or less, a retardation of 5 nm or less and a glass transition temperature of 170° C. or above.

EXAMPLE 3

Example 1 was followed except for using an acrylic surfactant (Disparon L-1980, manufactured by Kusumoto Kasei K.K.) in place of the silicone surfactant, thereby continuously giving epoxy optical sheets of 400 $\mu$m in average thickness, which had a thickness accuracy of ±40 $\mu$m or less, a retardation of 5 nm or less and a glass transition temperature of 170° C. or above.

EXAMPLE 4

Example 1 was followed except for discharging the epoxy resin coating solution at a rate of 75 g/minute, thereby continuously obtaining epoxy optical sheets of 300 $\mu$m in average thickness, which had a thickness accuracy of ±30 $\mu$m or less, a retardation of 5 nm or less and a glass transition temperature of 170° C. or above.

COMPARATIVE EXAMPLE 1

Example 1 was followed except for adding no silicone surfactant. The sheet obtained showed a matt surface, which made it unusable as an optical sheet.

COMPARATIVE EXAMPLE 2

Example 1 was followed except for hardening the spread layer of the epoxy resin coating solution at 120° C. for 15 minutes. The epoxy optical sheet obtained had a glass transition temperature lower than 170° C. When the sheet was used as a cell substrate in the construction of a liquid cell display device, it became warped due to the insufficient heat resistance thereof.

While the invention has been described in detail and with reference to specific examples thereof, it will be apparent to one skilled in the art that various changes and modifications can be made therein without departing from the spirit and scope thereof.

What is claimed is:

1. An epoxy optical sheet comprising a hardened sheet comprising an epoxy resin, and another resin layer formed on one side thereof, wherein the sheet has a retardation of 5 nm or less, an average thickness of 500 $\mu$m or less, a thickness accuracy of ±10% or less and a glass transition temperature of 170° C. or above, and the sheet has a smooth surface.

2. The epoxy optical sheet as claimed in claim 1, wherein said epoxy resin is an alicyclic epoxy resin.

* * * * *